Oct. 20, 1925. 1,558,432
J. H. WILSON
AUTOMATIC VEHICLE WHEEL TRACK
Filed Sept. 6, 1923 2 Sheets-Sheet 1
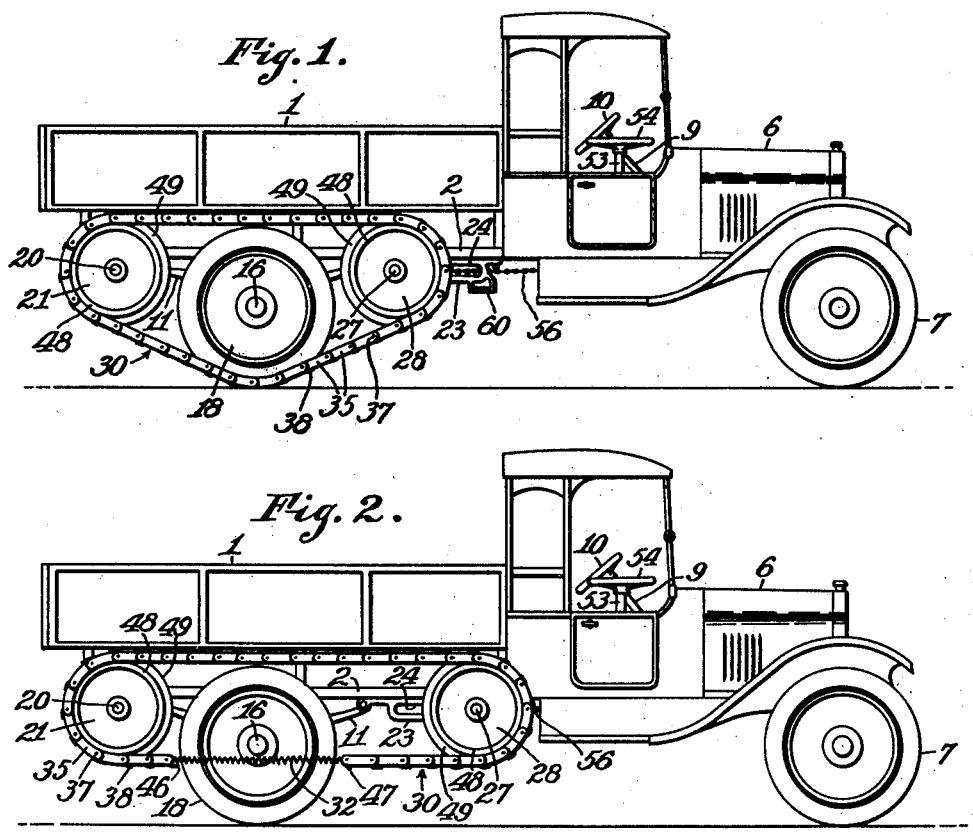
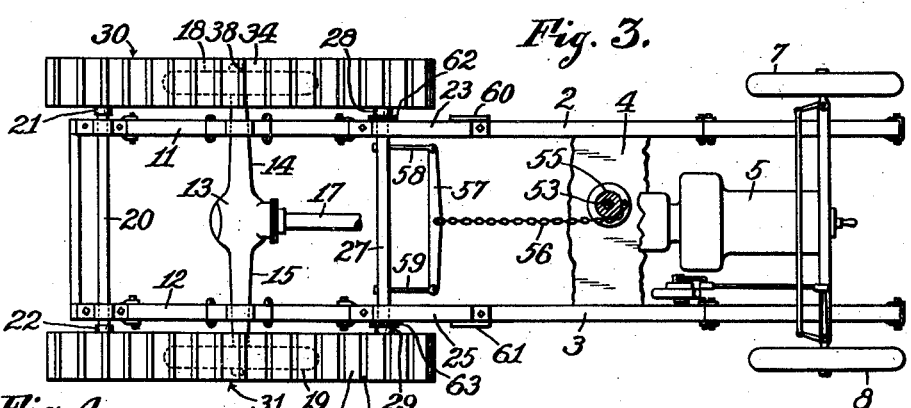
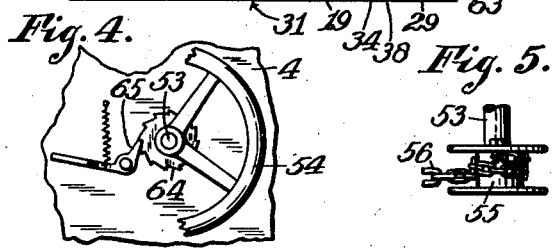
INVENTOR:
John H. Wilson,
BY
E. T. Silvius,
ATTORNEY.

Oct. 20, 1925.
J. H. WILSON
1,558,432
AUTOMATIC VEHICLE WHEEL TRACK
Filed Sept. 6, 1923   2 Sheets-Sheet 2
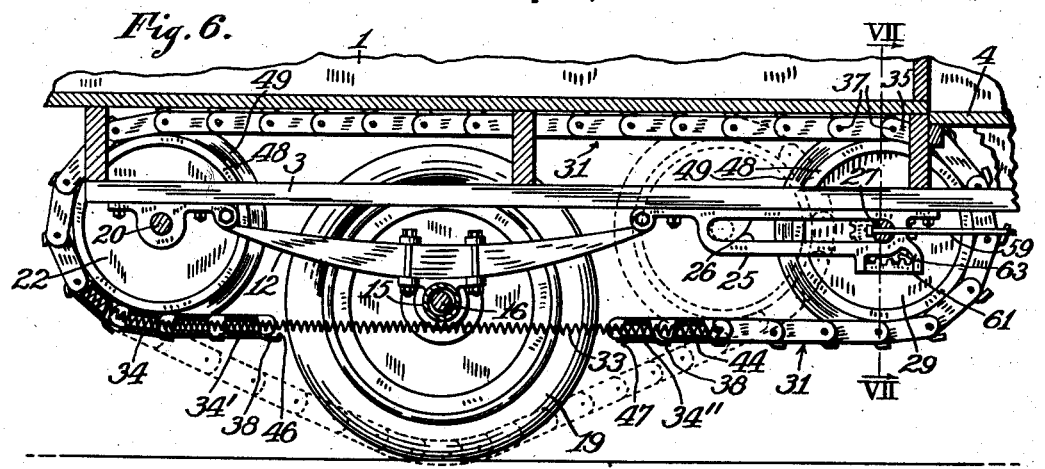
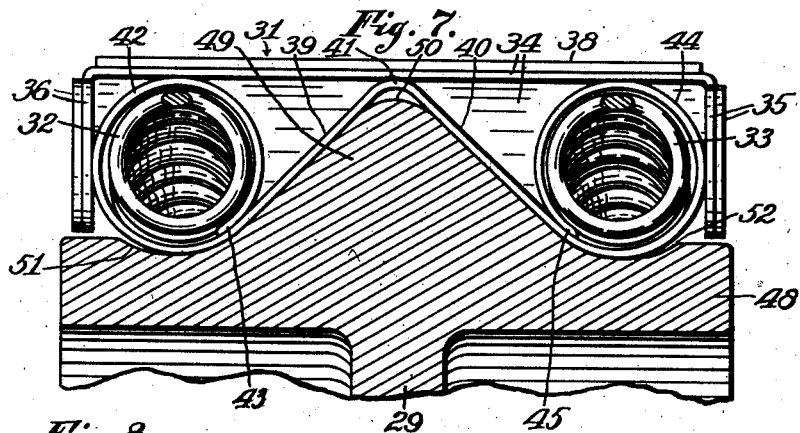
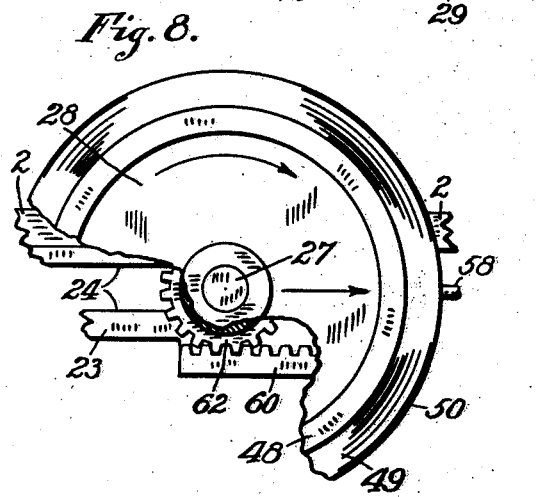
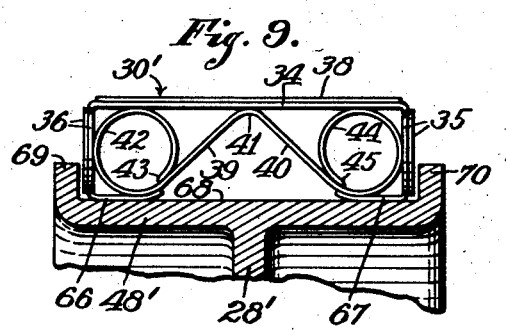
INVENTOR:
John H. Wilson,
BY
E. T. Silvius,
ATTORNEY.

Patented Oct. 20, 1925.

1,558,432

UNITED STATES PATENT OFFICE.

JOHN H. WILSON, OF INDIANAPOLIS, INDIANA.

AUTOMATIC VEHICLE WHEEL TRACK.

Application filed September 6, 1923. Serial No. 661,187.

*To all whom it may concern:*

Be it known that I, JOHN H. WILSON, a citizen of the United States, residing at Indianapolis, in the county of Marion and State of Indiana, have invented a new and useful Automatic Vehicle Wheel Track, of which the following is a specification, reference being had to the accompanying drawings and to the figures of reference marked thereon.

This invention relates to vehicles having carrying wheels and has reference more particularly to tracks for preventing the wheels of the vehicle from sinking into soft or muddy ground, either in roads, fields, or elsewhere.

An object of the invention is to provide a movable track for vehicle wheels that shall be so constructed and mounted on a vehicle as to be adapted to be quickly placed in position for use when needed, and which may be taken up after having been used and conveniently carried for use when an emergency again arises.

Another object is to provide an improved wheel track and mounting which shall enable a driver or operator of a vehicle to cause the track to be quickly put in operation when the vehicle is moving and approaching soft or muddy ground, to prevent the vehicle wheels from sinking into such ground with consequent delay and trouble resulting from the wheels sticking fast and preventing advance of the vehicle.

A further object is to provide a continuous vehicle track on which wheels may easily roll to support the wheels on soft ground, and which shall be adapted to be applied not only to motor trucks but to trailers and wagons that may be drawn either by tractors or horses.

A still further object is to provide an improved endless track for vehicle wheels, and mounting and controlling apparatus therefor, which shall be adapted to operate automatically when released for action, and permitting ready manual control to prevent functioning of the track when not needed.

With the above-mentioned and other objects in view, the invention consists in a track for vehicle wheels and means for carrying the track on a vehicle, being constructed for automatically functioning when not prevented by the operator of the vehicle; and the invention consists also further in the novel parts, and in the combinations and arrangements of parts, as hereinafter particularly described and further defined in the claims appended hereto.

Referring to the drawings,—Figure 1 is a side elevation of a motor truck having the invention applied thereto and shown in operative position; Fig. 2 is a side elevation of the vehicle having the wheel track arranged in non-operative position; Fig. 3 is an inverted plan showing the vehicle frame and also the principal features of the invention connected therewith; Fig. 4 is a fragmentary top plan of the controlling gearing of the wheel track on an enlarged scale; Fig. 5 is a fragmentary side view of parts of the controlling gearing on an enlarged scale; Fig. 6 is an approximately central longitudinal sectional elevation of the invention and parts of the truck on an enlarged scale; Fig. 7 is a fragmentary section approximately on the line VII—VII in Fig. 6, on an enlarged scale; Fig. 8 is a fragmentary side view showing parts of the track controlling apparatus on an enlarged scale; and, Fig. 9 is a fragmentary section showing slight modifications of structure.

Similar reference characters in the different figures of the drawings indicate corresponding elements or features of construction herein referred to in detail.

The invention is for descriptive purposes illustrated in connection with a motor truck, although applicable to other vehicles, the numeral 1 indicating the body of the truck generally which has a suitable frame commonly comprising two frame bars 2 and 3, the body including a floor 4 arranged to be used by the operator of the vehicle back of the motor 5 usually having a hood 6. The vehicle has front wheels 7 and 8 as usual and a steering column 9, and also a steering wheel 10 arranged above the floor conveniently close to the operator's position. The rearward portion of the vehicle commonly is provided with springs 11 and 12 supported on an axle casing comprising a differential housing 13 and axle portions 14 and 15 in each of which is an axle member 16, there being a driving shaft 17 extending into the differential housing, and driving wheels 18 and 19 secured to the axle members, as in common practice. The driving wheels which usually carry the major part of the load may be variously constructed.

In carrying out the objects of the invention a guide shaft 20 is secured to the vehicle frame, as to the bars 2 and 3, and two guide pulleys 21 and 22 are suitably mounted rotatably on the shaft, so as to be rearward of the driving wheels respectively, the shaft being higher than the driving wheel axle. Forward of the driving wheels the frame is provided with a horizontal guide 23 having a guide slot 24 therein and a guide 25 having a guide slot 26 therein, the guides being longitudinally arranged and shown as attached to the frame bars 2 and 3 respectively. An adjusting axle or shaft 27 is arranged in the guide slots 24 and 25 to be moved towards or away from the shaft 20, and two pulleys 28 and 29 are rotatably mounted on the shaft so as to be forward of the driving wheels. A continuous flexible track 30 of suitable construction so as to be flexible is guided on the pulleys 21 and 28 and may be brought to operative arrangement under the driving wheel 18, a similar track 31 guided on the pulleys 22 and 29 and being adapted to be brought to operative position under the driving wheel 19. The numerals 30 and 31 indicate the tracks generally and they have longitudinally elastic portions 32 and 33 respectively, permitting lengthening of the track structure so as to form a gap to clear the driving wheels when the track is not required to be used. The tracks may be variously constructed as to details and of various materials suitable for the purpose.

Each track as preferably constructed comprises a suitable number of sections, each section comprising a tread plate 34 and two side bars 35 and 36 that extend from the ends of the plate at approximately right angles thereto, being slightly longer than the plate and constituting chain links, each link being connected to two adjacent links by means of pivots 37, one edge of each tread plate having a pressed-up lip 38 that overlaps the adjacent edge portion of the next adjacent tread plate to constitute a joint plate and also a traction-increasing cleat. Each tread plate is centrally braced by two angular plates 39 and 40 connected together to form a supporting portion 41 seated on the inner side of the middle portion of a tread plate and suitably secured thereto, as by welding. The brace plates extend divergently from the tread plate and are adapted to constitute back bearing plates of the section, one plate being bent around against the side bar 36 and thence against the tread plate and around to the brace portion 39 to form a ring 42 that is secured to the side bar and the tread plate and has a lap portion 43 secured to the brace portion 39, the ring thus formed constituting a guide through which the elastic part 32 extends, said part being in the form of a coil spring of suitable length and secured at its ends to sections of the track. The opposite plate 40 is bent around in the opposite direction to form a guide ring 44 which is secured to the side bar 35 and tread plate, and has a lap portion 45 secured to the brace portion 40. The sectional track is of such length that it be continuous under the driving or carrying wheel while extending about its guide pulleys 21 and 28, the latter pulley being in its rearward position near the driving wheel, and the two tread plates 34' and 34" of the end sections having interlocking reversely arranged lugs 46 and 47 to render the track continuous in operation; the lugs, however, being adapted to be disconnected when considerable force is applied to move the pulley 28 forward. The companion elastic part 33, in the form of a coil spring is arranged in the guide rings 44, extending through a suitable number of the track sections and secured at its ends to the sections in which its ends terminate. The springs are strained under tension so as to draw the end sections of the track together, and the springs may extend not only across the gap between the end sections but through most of the sections of the track.

Each pulley has a rim 48 for guiding the track and preferably the periphery of the rim has a guide rib 49 thereon adapted to seat against the braces 39 and 40, the rib having a blunt peripheral portion 50 to clear the seat portion 41, so that the sides of the rib shall have close friction-drive contact with the plates 39 and 40. The rim 48 has also guide grooves 51 and 52 arranged to receive portions of the guide rings 42 and 44 respectively, but are designed to guide the springs 32 and 33 when they come into contact with the guide pulley, particularly to prevent the springs from working over the edges of the pulley.

The axle 27 may be moved and controlled by various means, a suitable device comprising a winding-shaft 53 mounted upon the floor 4 and having a hand-wheel 54 secured thereto so as to be in reach of the operator, a winding spool 55 being secured to the winding-shaft below the floor and having a cable 56 connected thereto, the cable being connected to a suitable draft equalizer which may comprise a beam 57 and pull-rods 58 and 59 connected thereto and to the axle 27. Two toothed rack bars 60 and 61 are fixed to the guides 23 and 25 respectively adjacent to the forward ends thereof, gear wheels 62 and 63 are secured to the pulleys 28 and 29 respectively, or to the hubs of the pulleys, and come into operation with the rack bars only when the axle 27 is moving nearly at the front end of its guides. When the cable 56 is wound on the winding spool, unwinding is prevented by means of a ratchet wheel 64 fixed on the winding-shaft, and a pawl 65 mounted on the floor 4 to cooperate with the ratchet wheel.

In some cases the guide pulleys for the sectional tracks are slightly modified and the sections of the track are accordingly modified, each track section having a plate 66 fixed to the side bar 36 and to the ring 42 adjacent to the brace or seat plate 39, and also a plate 67 fixed to the side bar 35 and to the ring 44, in which case the pulley 28' has a rim 48' which has a straight face 68 with which the back plates 66 and 67 of the track sections come into contact, and the rim has side flanges 69 and 70 between which the track sections are guided.

In practical use, the axle 27 is in position at the rear ends of its guide slots 24 and 26, after releasing the axle during movement of the vehicle, the tracks then being continuous and extending under the driving wheels, as appearing in Fig. 1 and shown by broken lines in Fig. 6, the driving wheels rolling on the track section backs formed by the braces 39 and 40 and frictionally adhering thereto to exert tractive force. As the driving wheel rolls along, the track is guided on and turns the guide pulleys. When the tracks are not longer needed, with a good road to run upon, the operator properly turns the hand wheel 54 and causes the cable 56 to be wound on its winding-spool, resulting in the axle 27 being forcibly drawn forward, which may be done during movement of the vehicle, the springs of the tracks permitting the ends of the tracks to be forced apart to form a gap in each track through which the driving wheel drops to the ground and permitting the track to assume the conditions shown in Figs. 2 and 6, with the driving wheel between the two springs, the latter extending straight under the driving wheel axle and hubs. As the terminal tread plate 34' is pulled up behind the driving wheel when the vehicle is moving forward, the tread plate may not ordinarily clear the wheel or its tire, but as the axle 27 nears the end of its travel in its guide slots the gear wheels engage the rack bars and cause the adjustable guide pulleys 28 and 29 to slightly rotate before the axle 27 comes to its stop, the rotation causing a slight movement of the track which draws the tread plate 34' away from the driving wheel. Reverse conditions and operations result when the vehicle is moving backwards. The track automatically assumes operative position when not restrained.

What is claimed as new is:—

1. An automatic vehicle-wheel track including a continuous flexible track having a longitudinally elastic structural part permitting a gap in the track, and two pulleys to guide the track, one of the pulleys being movable to elongate the elastic part and cause the gap in the track.

2. An automatic vehicle-wheel track having a plurality of sections pivotally connected together, two of the sections being end sections having lugs detachably connecting the end sections together, and two coil springs extending loosely through the end sections and other sections and connected to other sections farther from the end sections.

3. An automatic vehicle-wheel track including a continuous flexible track comprising connected sections having guide rings therein, two of the sections being detachably connected together, and a coil spring loosely guided in the rings in the detachably connected sections and other sections and secured to other sections farther from the detachably connected sections.

4. An automatic vehicle-wheel track including a flexible track having two ends to be connected together for continuity of trackage, a spring extending along the back of the track from the ends thereof and connected to the track distant from the ends to permit a gap in the track for receiving a vehicle-wheel, and two pulleys to guide the track, one of the pulleys being adjustable toward or from the other.

5. An automatic vehicle-wheel track having a sectional tread portion and a longitudinally elastic portion connected together to permit a gap in the tread portion with the elastic portion extending across the gap, two guide pulleys for the track, one of the pulleys being bodily movable and automatically drawn by the springs towards the other pulley, and means for forcibly moving the bodily movable pulley in the opposite direction against the action of the springs.

6. An automatic vehicle-wheel track including a plurality of sections, each section comprising a tread plate and two side bars fixed to the plate, the side bars of the sections being pivoted to those of other sections, two guide rings in each section fixed to the side bars respectively and to the tread plate, and two brace plates fixed to the middle of the back of the tread plate and connected to the rings respectively, there being two end sections detachably connected together, and two coil springs extending loosely through the guide rings respectively in the end sections and other sections of the track and connected to other sections farther from the end sections.

7. An automatic vehicle-wheel track including a guide shaft, a guide pulley rotatable on the shaft, an adjusting axle adjustable towards or from the guide shaft, a pulley rotatable on the adjusting axle, a continuous track comprising sections pivotally connected together and extending about the two pulleys, two of the sections being end sections and separable one from another to form a gap in the track, two coil springs extending loosely through the end sections of the track and through other sections and being guided therein, the springs being connected to other sections farther from the end sections, a guide for the adjusting axle, and means connected with the adjusting axle to forcibly draw it outward from the guide shaft.

8. In a vehicle-wheel track, the combination, with a vehicle comprising two carrying wheels and a body thereon, of a sectional continuous track for each of the carrying wheels to support the wheel, each track structure having a longitudinally extensible portion adapted to form a gap in the track to receive the wheel, each track being provided with two guide pulleys mounted on the vehicle body forward and rearward of the wheel, one of the pulleys being adjustable toward or from the wheel, and means co-operating with the vehicle body to synchronously control the adjustability of the adjustable pulleys.

9. In a vehicle-wheel track, a plurality of sections having each a tread plate and two side bars on the two opposite edges of the plate, the side bars being pivoted to the side bars on other tread plates, each section being provided with two guide rings fixed to the side bars respectively and to the tread plate and provided also with bracing back plates connected to the rings respectively and to the tread plate between the rings, two of said sections being end parts and detachably connected together, and two coil springs extending loosely through the guide rings in the end parts and secured to other sections distant therefrom.

10. In a vehicle-wheel track, the combination, with a vehicle comprising a frame and a carrying wheel supporting the frame, of a guide pulley rotatable on the frame rearward of the wheel, a guide fixed to the frame forward of the wheel and having a rack bar fixed thereto, a guide shaft adjustably supported by the guide, a guide pulley rotatable on the guide shaft and being movable thereby away from the other guide pulley, a sectional track for the carrying wheel extending about the pulleys and having two end parts separably connected together, two coil springs each extending loosely through said end parts and secured to sections of the track distant from the end parts, means to forcibly move the guide shaft away from the carrying wheel to the end of said guide, and a gear wheel fixed to the pulley on the guide shaft to be carried into engagement with the rack bar as the guide shaft nears the end of its guide.

11. In a vehicle-wheel track, the combination, with a vehicle comprising a frame and a carrying wheel supporting the frame, of a guide pulley rotatable on the frame rearward of the wheel, a guide shaft adjustably supported on the frame forward of the wheel, a guide pulley rotatably supported on the guide shaft and being adjustable thereby toward or from the other pulley, a sectional track extending about the pulleys and adapted to extend under the carrying wheel, two parts of the track being separable each from the other to form a gap to receive the carrying wheel, the track having two coil springs extending along portions of the back of the track and across the gap, the ends of the springs being connected to sections of the track at considerable distances from the gap, and power means supported substantially by the frame and connected with the guide shaft to control the adjustability of the shaft.

12. In a vehicle-wheel track, the combination, of a truck frame with a floor thereon, two driving wheels supporting the frame, a guide shaft secured to the frame rearward of the wheels, two guides fixed to the frame forward of the wheels and having each a longitudinal guide slot therein, two rack bars fixed to the guides respectively, an adjusting shaft supported in the slots of the two guides and movable towards or from the guide shaft, two guide pulleys rotatably mounted on the guide shaft, two guide pulleys rotatably mounted on the adjusting shaft, and having each a gear-wheel fixed on the inner side thereof to be carried into engagement with one of the rack bars, a sectional continuous track for each of the carrying wheels to support the wheel, each track extending about the guide pulleys that are forward and rearward of the wheel and being guided thereby, each track structure having a longitudinally extensible portion adapted to form a gap to receive the wheel, an equalizing yoke connected to the adjusting shaft, a cable connected to the yoke, a winding-shaft rotatable in and extending through said floor, a spool fixed to the winding-shaft below the floor and having connection with the cable, a ratchet wheel fixed to the winding-shaft above the floor, a pawl supported upon the floor to engage the ratchet wheel, and a hand-wheel secured to the top of the winding-shaft.

In testimony whereof, I affix my signature on the 1st day of September, 1923.

JOHN H. WILSON.